(12) United States Patent
Schmidt et al.

(10) Patent No.: US 6,378,599 B1
(45) Date of Patent: *Apr. 30, 2002

(54) FOUNDRY BINDER

(75) Inventors: Helmut Schmidt, Saarbruecken-Guedingen; Martin Mennig, Quierschied; Gerhard Jonschker, Spiesen-Elversberg, all of (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/297,572

(22) PCT Filed: Nov. 14, 1997

(86) PCT No.: PCT/EP97/06373

§ 371 Date: May 3, 1999

§ 102(e) Date: May 3, 1999

(87) PCT Pub. No.: WO98/22241

PCT Pub. Date: May 28, 1998

(30) Foreign Application Priority Data

Nov. 15, 1996 (DE) ......................... 196 47 368

(51) Int. Cl.$^7$ ................................. B22C 1/16
(52) U.S. Cl. .................. 164/525; 164/528; 523/139
(58) Field of Search ................ 164/525, 518, 164/521, 522, 528; 523/139

(56) References Cited

U.S. PATENT DOCUMENTS 4,268,425 A * 5/1981 Gardikes .................. 260/19 A
4,602,069 A * 7/1986 Dunnavant et al. .......... 525/504
4,626,560 A * 12/1986 Marsden et al. ............. 523/145
5,250,475 A * 10/1993 Mogensen et al. ........... 501/94
5,582,231 A * 12/1996 Siak et al. .................. 164/525
5,719,206 A * 2/1998 Mihoya et al. .............. 523/212
5,766,680 A * 6/1998 Schmidt et al. ............. 427/226
5,884,688 A * 3/1999 Hinton et al. ............... 164/527
6,287,639 B1 * 9/2001 Schmidt et al. ............. 427/387

FOREIGN PATENT DOCUMENTS

DE          44 17 405   * 11/1995   ........... C03C/17/25
EP          0 739 666   * 10/1996   ............. B22C/1/22

* cited by examiner

Primary Examiner—Tom Dunn
Assistant Examiner—Kevin P. Kerns
(74) Attorney, Agent, or Firm—Heller Ehrman White & McAuliffe LLP

(57) ABSTRACT

A foundry binder is obtainable by surface modification of
  a) colloidal inorganic particles with
  b) one or more silanes of the general formula (I)

$$R_x\text{—Si—}A_{4-x} \quad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a below-stoichiometric amount of water, based on the hydrolysable groups which are present, with formation of a nanocomposite sol, and further hydrolysis and condensation of the nanocomposite sol, if desired, before it is brought into contact with the foundry sand.

17 Claims, No Drawings

FOUNDRY BINDER

BRIEF SUMMARY OF THE INVENTION

The invention relates to a foundry binder which is obtainable by surface modification of a) colloidal inorganic particles with b) one or more silanes of the general formula (I)

$$R_x\text{—Si—}A_{4-x} \tag{I}$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a substoichiometric amount of water, based on the hydrolysable groups which are present, with formation of a nanocomposite sol, and further hydrolysis and condensation of the nanocomposite sol, if desired, before it is brought into contact with the foundry sand.

The nanocomposite sol employed according to the invention is prepared by surface modification of colloidal inorganic particles (a) with one or more silanes (b), if desired in the presence of other additives (c) under the conditions of the sol-gel process.

DETAILED DESCRIPTION OF THE INVENTION

Details of the sol-gel process are described in C. J. Brinker, G. W. Scherer: "Sol-Gel Science—The Physics and Chemistry of Sol-Gel-Processing", Academic Press, Boston, San Diego, New York, Sydney (1990) and in DE 1941191, DE 3719339, DE 4020316 and DE 4217432.

Here, specific examples of the silanes (b) which can be employed according to the invention and of their radicals A which are hydrolytically removable and their radicals R which are not hydrolytically removable are given.

Preferred examples of groups A which are removable hydrolytically are hydrogen, halogen (F, Cl, Br and I, in particular Cl and Br), alkoxy (in particular $C_{2-4}$-alkoxy, such as ethoxy, n-propoxy, isopropoxy and butoxy), aryloxy (in particular $C_{6-10}$-aryloxy, such as phenoxy), alkaryloxy (e.g. benzyloxy), acyloxy (in particular $C_{1-4}$-acyloxy, such as acetoxy and propionyloxy) and alkylcarbonyl (e.g. acetyl). Radicals A which are likewise suitable are amino groups (e.g. mono- or dialkyl-, -aryl- and -aralkylamino groups having the abovementioned alkyl, aryl and aralkyl radicals), amide groups (e.g. benzamido) and aldoxime or ketoxime groups. Two or three radicals A may also together form a moiety which complexes the Si atom, as for example in Si-polyol complexes derived from glycol, glycerol or pyrocatechol. Particularly preferred radicals A are $C_{2-4}$-alkoxy groups, in particular ethoxy. Methoxy groups are less suitable for the purposes of the invention, since they have an excessively high reactivity (short processing time of the nanocomposite sol).

The abovementioned hydrolysable groups A may, if desired, carry one or more usual substituents, for example halogen or alkoxy.

The radicals R which are not hydrolytically removable are preferably selected from the group consisting of alkyl (in particular $C_{1-4}$-alkyl, such as methyl, ethyl, propyl and butyl), alkenyl (in particular $C_{2-4}$-alkenyl, such as vinyl, 1-propenyl, 2-propenyl and butenyl), alkynyl (in particular $C_{2-4}$-alkynyl, such as acetylenyl and propargyl), aryl (in particular $C_{6-10}$-aryl, such as phenyl and naphthyl) and the corresponding alkaryl and arylalkyl groups. These groups may also, if desired, have one or more usual substituents, for example halogen, alkoxy, hydroxy, amino or epoxide groups.

The abovementioned alkyl, alkenyl and alkynyl groups include the corresponding cyclic radicals, such as cyclopropyl, cyclopentyl and cyclohexyl.

Particularly preferred radicals R are substituted or unsubstituted $C_{1-4}$-alkyl groups, in particular methyl and ethyl, and substituted or unsubstituted $C_{6-10}$-alkyl groups, in particular phenyl.

It is also preferable that x in the above formula (I) is 0, 1 or 2, particularly preferably 0 or 1. It is also preferable if x=1 in at least 60 mol %, in particular at least 70 mol %, of the silanes of the formula (I). In particular cases, it may be even more favourable if x=1 in more than 80 mol %, or even more than 90 mol % (e.g. 100 mol %), of the silanes of the formula (I).

The foundry binder according to the present invention may be prepared, for example, from pure methyltriethoxysilane (MTEOS) or from mixtures of MTEOS and tetraethoxysilane (TEOS), as component (b).

Concrete examples of silanes of the general formula (I) are compounds of the following formulae:

$Si(OC_2H_5)_4$, $Si(O\text{-n- or iso-}C_3H_7)_4$, $Si(OC_4H_9)_4$, $SiCl_4$, $Si(OOCCH_3)_4$, $CH_3\text{—}SiCl_3$, $CH_3\text{—}Si(OC_2H_5)_3$, $C_2H_5\text{—}SiCl_3$, $C_2H_5\text{—}Si(OC_2H_5)_3$, $C_3H_7\text{—}(OC_2H_5)_3$, $C_6H_5\text{—}Si\text{—}(OC_2H_5)_3$, $C_6H_5\text{—}Si(OC_2H_5)_3$ $(C_2H_5O)_3\text{—}Si\text{—}C_3H_6\text{—}Cl$, $(CH_3)_2SiCl_2$, $(CH_3)_2Si(OC_2H_5)_2(CH_3)_2Si(OH)_2$, $(C_6H_5)_2SiCl_2$, $(C_6H_5)_2Si(OC_2H_5)_2$, $(C_6H_5)_2Si(OC_2H_5)_2$, $(\text{iso-}C_3H_7)_3SiOH$, $CH_2\text{=}CH\text{—}Si(OOCCH_3)_3$, $CH_2\text{=}CH\text{—}SiCl_3$, $CH_2\text{=}CH\text{—}Si(OC_2H_5)_3$, $HSiCl_3$, $CH_2\text{=}CH\text{—}Si(OC_2H_4OCH_3)_3$, $CH_2\text{=}CH\text{—}CH_2\text{—}Si(OC_2H_5)_3$, $CH_2\text{=}CH\text{—}CH_2\text{—}Si(OOCCH_3)_3$, $CH_2\text{=}C(CH_3)COO\text{—}C_3H_7\text{—}Si\text{—}(OC_2H_5)_3$, $CH_2\text{=}C(CH_3)\text{—}COO\text{—}C_3H_7\text{—}Si(OC_2H_5)_3$, $\text{n-}C_6H_{13}\text{—}CH_2\text{—}CH_2\text{—}Si(OC_2H_5)_3$, $\text{n-}C_8H_{17}\text{—}CH_2\text{—}CH_2\text{—}Si(OC_2H_5)_3$,

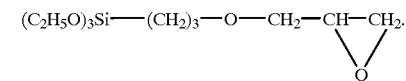

These silanes can be prepared by known methods; cf. W. Noll, "Chemie und Technologie der Silicone" [Chemistry and Technology of the Silicones], Verlag Chemie GmbH, Weinheim/Bergstraße, Germany (1968).

Based on the abovementioned components (a), (b) and (c), the proportion of component (b) is usually from 20 to 95% by weight, preferably from 40 to 90% by weight, and particularly preferably from 70 to 90% by weight, expressed as polysiloxane of the formula: $R_xSiO_{(2-0.5x)}$ which is formed in the condensation.

The silanes of the general formula (I) used according to the invention may be employed wholly or partially in the form of precondensates, i.e. compounds produced by partial hydrolysis of the silanes of the formula (I), either alone or in a mixture with other hydrolysable compounds. Such oligomers, preferably soluble in the reaction medium, may be straight-chain or cyclic low-molecular-weight partial condensates (polyorgano-siloxanes) having a degree of condensation of e.g. from about 2 to 100, in particular from about 2 to 6.

The amount of water employed for hydrolysis and condensation of the silanes of the formula (I) is preferably from 0.1 to 0.9 mol, and particularly preferably from 0.25 to 0.75 mol, of water per mole of the hydrolysable groups which are present. Particularly good results are often achieved with from 0.35 to 0.45 mol of water per mole of the hydrolysable groups which are present.

Specific examples of colloidal inorganic particles (a) are sols and powders dispersible at the nano level (particle size preferably up to 300 nm, in particular up to 100 nm and particularly preferably up to 50 nm) of $SiO_2$, $TiO_2$, $ZrO_2$, $Al_2O_3$, $Y_2O_3$, $CeO_2$, $SnO_2$, ZnO, iron oxides or carbon (carbon black and graphite), in particular of $SiO_2$.

The proportion of component (a), based on the components (a), (b) and (c), is usually from 5 to 60% by weight, preferably from 10 to 40% by weight, and particularly preferably from 10 to 20% by weight.

For preparing the nanocomposite, other additives in amounts of up to 20% by weight, preferably up to 10% by weight, and in particular up to 5% by weight, may be employed as optional components (c); examples are curing catalysts, such as metal salts and metal alkoxides (e.g. aluminium alkoxides, titanium alkoxides or zirconium alkoxides), organic binders, such as polyvinyl alcohol, polyvinyl acetate, starch, polyethylene glycol and gum arabic, pigments, dyes, flame retardants, compounds of glass-forming elements (e.g. boric acid, boric acid esters, sodium methoxide, potassium acetate, aluminium sec-butoxide, etc).

The hydrolysis and condensation is carried out under sol-gel conditions in the presence of acid condensation catalysts (e.g. hydrochloric acid) at a pH of preferably from 1 to 2, until a viscous sol is produced.

It is preferable if no additional solvent is used besides the solvent produced in the hydrolysis of the alkoxy groups. If desired, however, alcoholic solvents, such as ethanol, or other polar, protic or aprotic solvents, such as tetrahydrofuran, dioxane, dimethylformamide or butyl glycol, for example, may be employed.

In order to achieve a favourable sol particle morphology and sol viscosity, the resultant nanocomposite sol is preferably subjected to a special post-reaction step in which the reaction mixture is heated to temperatures of from 40 to 120° C. over a period of from a number of hours to a number of days. Special preference is given to storage for one day at room temperature or heating for a number of hours at from 60 to 80° C. This gives a nanocomposite sol with a viscosity of preferably from 5 to 500 mpas, particularly preferably from 10 to 50 mPas. The viscosity of the sol can also, of course, be adjusted to suitable values for the specific application by adding solvents or removing side-products of the reaction (e.g. alcohols). The post-reaction step may preferably also be coupled with a reduction of the solvent content.

The nanocomposite sol and the foundry sand are combined after at least initial hydrolysis of component (b) and in any case before final curing. Before it is brought into contact with the sand, the nanocomposite sol is preferably activated by feeding in a further amount of water.

For the production of foundry molds and cores, the nanocomposite sol is admixed with the foundry mold or core sand in the usual amounts, e.g. in an amount of from 0.1 to 20% by weight.

Additionally, conventional foundry additives may be used, if desired, such as, e.g., solidification oils, core oils, release agents or conventional core binders.

The curing may be carried out at room temperature, although a heat treatment at temperatures of above 50° C., preferably above 100° C., and more preferably at 150° C. or above, is preferred. Curing may, optionally, be carried out in an inert gas atmosphere.

It is found that in comparison to conventionally bonded cores a significantly lower amount of off-gas is emitted and that the mold can be freed from sandy deposits by means of the conventional standard procedures. Furthermore, a significantly smaller gas blast was observed during the casting operation, which is of decisive importance in practice since thereby a higher surface quality can be achieved and finer structures can be cast.

The following examples further illustrate the present invention.

In the following examples, the silica sol employed is an aqueous silica sol from BAYER ("Levasil 300/30") with a solids content of 30% by weight and a particle size of from 7 to 10 nm. The following abbreviations are furthermore used in the examples:

MTEOS = Methyltriethoxysilane
TEOS = Tetraethoxysilane
PTEOS = Phenyltriethoxysilane
ETEOS = Ethyltriethoxysilane

EXAMPLE 1

51.3 ml of MTEOS (corresponding to 60 mol %), 19.1 ml of TEOS (corresponding to 20 mol %) and 15.0 ml of PTEOS (corresponding to 20 mol %) are mixed, and half of this mixture is vigorously stirred with 11.7 ml of silica sol (corresponding to a proportion of silica sol of 14.3% by weight) and 0.386 ml of concentrated hydrochloric acid. After 5 minutes, the second half of the alkoxide mixture is added to the charge and then stirring is continued for a further 5 minutes. The resultant sol is then subjected to a post-reaction step (standing at 60° C. for 12 hours).

About 2.5 ml of water are added to the sol before it is used, in order to reach a water content of 0.5 mol of water per mole of hydrolysable group. The resultant sol is mixed with an amount of sand of a particle size of about 1 mm, so that about 84% of the total weight consists of the sand. The material is tamped in a mould and hardened at 100° C. for 20 minutes, giving a mechanically robust shaped article which does not lose its shape even after exposure to a temperature of 500° C. for 1 hour.

EXAMPLE 2

Using the method of Example 1, a core sand binder is prepared from 184 ml of MTEOS, 51.4 ml of TEOS, 62.8 ml of silica sol and 1.71 ml of 37% hydrochloric acid. After post-reaction at room temperature for 15 minutes, the binder is ready for use. The solids content is 327 g/l.

Dry core sand is mixed with the binder in an amount giving 1.5% by weight solid binder content. The moist material is pressed with a ram for 30 minutes under a pressure of 100 kN and then cured for 1 hour at 140° C. in the press, giving an inorganically bound core which releases no toxic gases on being heated to 500° C. and can be disaggregated using ultrasound.

EXAMPLE 3

1. Preparation of Standard Binder A

A flask is charged with 655 g of MTEOS and 191 g TEOS and then 142 g of aqueous silica sol and immediately thereafter 9 ml of $H_2SO_4$ (40% by weight) are added to the resulting mixture with intensive stirring. After about 1 minute of intensive stirring an exothermic reaction sets in (temperature rise to about 60° C.). For aging the dispersion is kept at room temperature overnight or is refluxed for 1 hour to its further use.

2. Preparation of Standard Binder B

A flask is charged with 621 g of MTEOS and 181 g of TEOS and then 185 g of aqueous silica sol ("Levasil 50/50"; SiO2 solids content 50% by weight, produced by BAYER) and immediately thereafter 10.3 ml of $H_2SO_4$ (40% by weight) are added to the resulting mixture with intensive stirring. After about 1 minute of intensive stirring an exothermic reaction sets in (temperature rise to about 60° C.). For aging the dispersion is kept at room temperature overnight or refluxed for 1 hour prior to its further use.

3. Preparation of Standard Binder C

A flask is charged with 463 g of MTEOS, 180 g of TEOS and 128 g of dimethyldiethoxysilane, whereafter 267 g of aqueous silica sol and immediately thereafter 6.06 ml of HCl (37% by weight) are added to the resulting mixture with intensive stirring. After about 1 minute of intensive stirring an exothermic reaction sets in (temperature rise to about 60° C.). The dispersion can be used directly after cooling thereof to room temperature.

4. Production of Core Sand for Casting

Standard Binder A (10 kg, solids content: 34% by weight) is concentrated in a rotary evaporator to a solids content of 60% by weight. Under intensive stirring 90 ml of $H_2O$ are added dropwise to 1 kg of said concentrated binder dispersion and are intensively stirred for 10 minutes. Then 200 g of said mixture are intensively mixed with 10 kg of core sand in a vibratory agitator for 3 minutes and thereafter transferred into the reservoir of a core shooter conventional in the foundry industry.

By means of said core shooter molded bodies are shot according to the Hot-Box process at a mold temperature of 200° C., a pressure of 6.5 bar and an interval of 1.5 s. After 60 g the resulting sand cores are sufficiently cured for being removed from the mold. The cores are cast with grey cast iron and brass.

What is claimed is:

1. A method of manufacturing a foundry mold or core material comprising foundry mold of core sand and, as a binder, a nanocomposite sol or factory binder prepared therefrom, the method comprising the steps of:
   (1) surface modifying colloidal inorganic particles with one or more silanes of the general formula $R_x$—Si—$A_{4-x}$
   where
   each A is independently selected from hydroxyl and groups that are hydrolytically removable but are not methoxy,
   each R is independently selected from groups that are not hydrolytically removable, and
   x is 0, 1, 2, or 3,
   where $x \geq 1$ in at least 50 mol % of the silanes;
   under sol-gel process conditions with a quantity of water that is sub-stoichiometric based on the quantity of hydrolytically removable groups present on the silanes, thereby preparing the nanocomposite sol;
   (2) optionally-hydrolyzing and condensing the nanocomposite sol, thereby forming the foundry binder;
   (3) optionally activating the foundry binder with an additional quantity of water; and
   (4) combining the nanocomposite sol or foundry binder with foundry mold or core sand to form the foundry mold or core material.

2. The method of claim 1 where the step of preparing the nanocomposite sol is carried out in the presence of an acid condensation catalyst at a pH of from 1 to 2.

3. The method of claim 1 where the step of further hydrolyzing and condensing the nanocomposite sol takes place at a temperature between room temperature and 120° C.

4. The method of claim 1 where the colloidal inorganic particles are selected from the group consisting of sols and dispersible nanoscale powders of TiO2, $ZrO_2$, $Al_2O_3$, $Y_2O_3$, $CeO_2$, $SnO_2$, ZnO, iron oxides, and carbon.

5. The method of claim 1 where the colloidal inorganic particles comprise from 5% to 60% by weight of the nanocomposite.

6. The method of claim 1 where the silanes, when expressed as polysiloxane of the formula $R_xSiO_{(2-0.5x)}$, comprise from 20% to 95% by weight of the composite.

7. The method of claim 1 where additives are added during preparation of the nanocomposite sol.

8. The method of claim 7 where the additives are selected from the group consisting of curing catalysts, organic binders, and compounds of glass-forming elements.

9. The method of claim 8 where the additives comprise not more than 20% by weight of the nanocomposite.

10. The method of claim 1 where the quantity of water used in the step of preparing the nanocomposite sol is from 0.1 to 0.9 mol of water per mol of hydrolytically removable groups in the silanes.

11. The method of claim 1 where the step of combining the foundry binder with foundry mold or core sand includes the addition of at least one foundry additive.

12. The method of claim 11 where the at least one foundry additive is selected from the group consisting of solidification oils, core oils, release oils, and core binders.

13. A foundry mold or core material manufactured by the method of claim 1.

14. A method of manufacturing a foundry mold or core, the method comprising:
   (1) manufacturing a foundry mold or core material by the method of claim 1;
   (2) shaping the material into the foundry mold or core shape; and
   (3) curing the shaped material.

15. A foundry mold or core manufactured by the method of claim 14.

16. A method of manufacturing a foundry mold or core material comprising foundry mold or core sand and a foundry binder in the form of a nanocomposite sol, the method comprising:
   combining foundry mold or core sand with a foundry binder in the form of a nanocomposite sol, the nanocomposite sol comprising colloidal inorganic particles surface modified with one or more silanes of the general formula $R_x$—Si—$A_{4-x}$ where each A is independently selected from hydroxyl and groups that are hydrolytically removable but are not methoxy, each R is independently selected from groups that are not hydrolytically removable, and x is 0, 1, 2, or 3, where $x \geq 1$ in at least 50 mol % of the silanes; under sol-gel process conditions with a quantity of water that is sub-stoichiometric based on the quantity of hydrolytically removable groups present on the silanes.

17. A foundry mold or core material manufactured by the method of claim 16.

* * * * *

UNITED STATES PATENT AND TRADEMARK OFFICE
CERTIFICATE OF CORRECTION

PATENT NO. : 6,378,599 B1
DATED : April 30, 2002
INVENTOR(S) : Helmut Schmidt, Martin Mennig and Gerhard Jonschker It is certified that error appears in the above-identified patent and that said Letters Patent is hereby corrected as shown below:

<u>Column 6,</u>
Line 13, should read -- dispersible nanoscale powders of $SiO_2$, $TiO_2$, $ZrO_2$, $Al_2O_3$, $Y_2O_3$, --

Signed and Sealed this

Fifteenth Day of July, 2003

JAMES E. ROGAN
*Director of the United States Patent and Trademark Office*